(12) United States Patent
Xiong et al.

(10) Patent No.: US 7,096,490 B2
(45) Date of Patent: Aug. 22, 2006

(54) INFORMATION ROUTING DEVICE HAVING AN AUTO-CONFIGURATION FEATURE

(75) Inventors: Bo Xiong, Fremont, CA (US); Chuang Li, Saratoga, CA (US)

(73) Assignee: Actiontec Electronics, Inc., Sunnyvale, CA (US)

( * ) Notice: Subject to any disclaimer, the term of this patent is extended or adjusted under 35 U.S.C. 154(b) by 0 days.

(21) Appl. No.: 10/104,737

(22) Filed: Mar. 20, 2002

(65) Prior Publication Data

US 2003/0182548 A1 Sep. 25, 2003

(51) Int. Cl.
*G06F 15/16* (2006.01)
*G06F 13/00* (2006.01)

(52) U.S. Cl. .................... 726/3; 713/1; 713/2; 713/182; 713/183; 709/219; 709/222; 709/227; 709/228; 370/254; 370/255; 370/257; 370/389; 370/395.2; 370/395.3; 370/465; 710/11; 710/105

(58) Field of Classification Search ............... 713/183, 713/201, 202, 1, 2, 182; 709/222, 223, 224, 709/219, 227, 228; 370/225, 257, 389, 465, 370/254, 255, 395.2, 395.3; 726/3; 710/11, 710/105
See application file for complete search history.

(56) References Cited

U.S. PATENT DOCUMENTS

| 5,757,924 | A | * | 5/1998 | Friedman et al. | 380/49 |
| 5,781,550 | A | * | 7/1998 | Templin et al. | 370/401 |
| 5,864,559 | A | * | 1/1999 | Jou et al. | 370/465 |
| 5,931,928 | A | * | 8/1999 | Brennan et al. | 710/68 |
| 6,130,892 | A | * | 10/2000 | Short et al. | 370/401 |
| 6,161,133 | A | * | 12/2000 | Kikinis | 709/220 |
| 6,289,377 | B1 | * | 9/2001 | Lalwaney et al. | 709/222 |
| 6,460,084 | B1 | * | 10/2002 | Van Horne et al. | 709/227 |
| 6,591,306 | B1 | * | 7/2003 | Redlich | 709/245 |
| 2002/0004935 | A1 | * | 1/2002 | Huotari et al. | 717/11 |

* cited by examiner

*Primary Examiner*—Taghi T. Arani
(74) *Attorney, Agent, or Firm*—Fish & Neave IP Group Ropes & Gray LLP; Norman H. Beamer; Chi-Hsin Chang

(57) ABSTRACT

The present invention facilitates communications between a first network and a second network using an information routing device having an auto-configuration feature. The auto-configuration feature negotiates what authentication protocol will be used when the networks transfer information. Once the authentication protocol is negotiated by the device, the device intercepts and stores information transferred between networks. In this manner, the device can emulate a first network when coupled to a second network by providing the necessary stored information directly to the second network, and vice versa.

30 Claims, 3 Drawing Sheets

INFORMATION ROUTING DEVICE HAVING AN AUTO-CONFIGURATION FEATURE

FIELD OF THE INVENTION

The present invention relates to apparatus and methods for facilitating communications between a plurality of networks, such as an internet service provider and a personal computer. More particularly, the apparatus of the present invention uses an auto-configuration feature that intercepts and stores network authentication information by emulating a first network when interrogating a second network.

BACKGROUND OF THE INVENTION

The Internet is a vast, globe-spanning, collection of interconnected computer networks and the associated programs, protocols, and standards that enable these computers to communicate with each other. The World Wide Web ("web"), a popular application of the Internet, relies on a combination of various protocols and standards to make vast collections of digital content accessible via the Internet.

The globe-spanning nature of the Internet lets a user contact any computer connected to the Internet from any other computer connected to the Internet. This fundamental property of the Internet, combined with the ease of publishing content on the web, is largely responsible for the explosive growth of the Internet as a medium of communication.

An Internet service provider (ISP) is a company that provides individuals and other companies access to the Internet and other related services. An ISP has the equipment and the telecommunication line access required to have a point-of-presence on the Internet for the geographic area served. A dial-up Internet connection may be initiated between an ISP and a personal computer (PC) when the PC user provides the correct username and password to the ISP.

A point-to-point protocol (PPP) connection typically is used to establish a connection between an ISP and a personal computer (PC). Essentially, a PPP packages a computer's internet protocol (IP) packets and forwards them to the server where they can be put on the Internet. Before establishing communications over a point-to-point link, each end of the PPP link must send out link control protocol (LCP) packets. LCP packets either accept or reject the identity of the peer computer based on criteria such as common configurations and packet size limits.

Once the LCP packets accept the link, traffic can be transported on the network. To gain Internet access, the PC will send a request to the ISP, and the ISP then will challenge the PC to provide the correct username and password. Various authentication protocols may be used to ensure that the correct information has been provided to the ISP. Once the username and password have been authenticated, the ISP allows the user access to the Internet. Generally, the username and password must be provided to the ISP to establish a connection between the user's PC and the ISP.

A drawback associated with having to provide a username and password when challenged by the ISP is that a PC user is burdened by having to enter that identification information, which may increase the time and effort required on the part of the PC user. Another drawback associated with having to provide network identification information when challenged by the ISP is that multiple PC users in a local area network (LAN) may be denied access to the Internet because they do not know the master username and password. Although this may be an advantageous security feature in some settings, it may be desirable to share the Internet access through one ISP account, for example, in a house having three computers.

In view of these disadvantages it would be desirable to provide a device that facilitates information transfer between networks by automatically providing a first network with information when the first network requests that information from a second network.

It further would be desirable to provide a device that can intercept and store network authentication information by emulating a first network when coupled to a second network, and can emulate a second network when coupled to a first network.

It also would be desirable to provide a device that can emulate an ISP and interrogate a PC, so the device can obtain network authentication information without having had that information initially.

It also would be desirable to provide a device that can emulate a PC by automatically providing network authentication information to an ISP without having the PC user enter that information.

SUMMARY OF THE INVENTION

In view of the foregoing, it is an object of this invention to provide a device that facilitates information transfer between networks by automatically providing a first network with information when the first network requests that information from a second network.

It is another object of the present invention to provide a device that can intercept and store network authentication information by emulating a first network when coupled to a second network, and can emulate a second network when coupled to a first network.

It is also an object of this invention to provide a device that can emulate an ISP and interrogate a PC, so the device can obtain network authentication information without having had that information initially.

It is yet another object of this invention to provide a device that can emulate a PC by automatically providing network authentication information to an ISP without having the PC user enter that information.

These and other objects of the present invention are accomplished by providing a device having an auto-configuration feature that may receive and transmit communications between a first network and a second network. The device is configured to intercept and store network authentication information without user intervention.

In a preferred embodiment, a device constructed in accordance with principles of the present invention is configured to be interposed between a single computer or local area network ("LAN") and a wide area network ("WAN"), such as the Internet, and intercepts and stores network authentication information required for the LAN to communicate with the WAN. It does this by emulating the WAN, and attempting to negotiate a communication protocol between itself and the LAN that results in the provision of unencrypted network identification and authentication information to the device. That information is stored in the device for subsequent use, in which the device then emulates the single computer or LAN in communicating with the WAN.

In the preferred embodiment, the auto-configuration device comprises a first port that communicates with an internet service provider (ISP) and a second port that communicates with a local area network (LAN) having at least one client computer. When an ISP issues a challenge message to the client computer that is requesting access, the client computer provides the requested information, e.g., username and password. When the auto-configuration device is placed between the ISP and the client computer, the auto-configuration device intercepts the response containing the username and password, which may be encrypted. Software algorithms of the auto-configuration device cause the device to negotiate with the client computer regarding the authentication protocol to be used in the transfer of information. The software algorithms then cause the client computer to communicate in a selected authentication protocol, preferably password authentication protocol (PAP), which is not encrypted.

Once the auto-configuration device negotiates with the client computer to send the information using an unencrypted protocol, the auto-configuration device intercepts the username and password, and records that unencrypted information. The auto-configuration device then forwards that information in a defined encrypted protocol to the ISP. When the ISP receives the correct information in the encrypted protocol, it will allow the user access to the Internet.

Advantageously, the next time that the ISP issues a challenge message to a client computer requesting Internet access, the auto-configuration device intercepts the communication and automatically provides the ISP with the requested information that previously has been captured and stored.

In this manner, the auto-configuration device of the present invention emulates a second network (the LAN) when interrogated by a first network. For example, when the ISP issues the challenge asking for the username and password, the auto-configuration device will emulate the PC user by automatically providing the ISP with the stored username and password. The auto-configuration device also emulates the first network (the ISP) when negotiating use of a protocol that permits the device to intercept and store the network identification and authentication information from the second network.

The auto-configuration device of the present invention similarly may be used to facilitate information transfer between other networks, such as wireless networks, by negotiating the authentication protocols to be used by the networks in communicating with the device, then storing transferred information and automatically providing the stored information at a later time.

BRIEF DESCRIPTION OF THE DRAWINGS

Further features of the invention, its nature and various advantages will be apparent from the accompanying drawings and the following detailed description of the preferred embodiments, in which.

DETAILED DESCRIPTION OF THE INVENTION

The present invention is directed to a device that facilitates the transfer of information between a plurality of networks. In accordance with the principles of the present invention, the software algorithms of the device cause the device to emulate a first network when coupled to a second network, and further emulate the second network when coupled to the first network. This allows the first and second networks to communicate with the auto-configuration device without having to communicate directly with each other.

Figure 1:
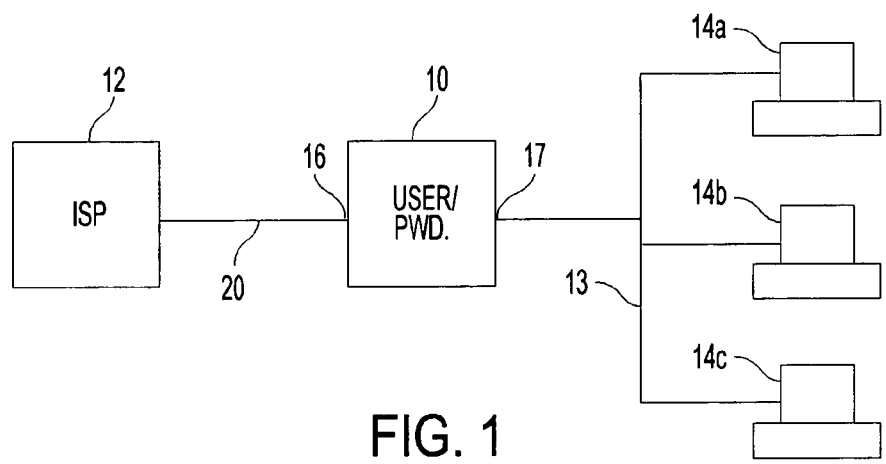
FIG. 1 is a schematic depicting communications between the auto-configuration device of the present invention and a first and second network.

Referring to FIG. 1, apparatus constructed in accordance with the present invention comprises auto-configuration device 10 having at least one microprocessor and programmed software algorithm stored within a memory in a housing. Auto-configuration device 10 preferably is coupled at first port 16 to transmitter 20 that communicates with a first network, for example, Internet Service Provider (ISP) 12. As shown in FIG. 1, transmitter 20 may be a dial-up modem, cable modem, Asymmetric Digital Subscriber Line (ADSL), or other means known in the art suitable for transmitting digital information.

Auto-configuration device 10 preferably is coupled at second port 17 to local area network (LAN) 13. One or more client machines 14 are attached to LAN 13 and may communicate with auto-configuration device 10. As described in detail in FIG. 3 hereinbelow, auto-configuration device 10 is configured to emulate any one of client machines 14 when interrogated by ISP 12 by automatically providing ISP 12 with information that has been requested. For example, auto-configuration device 10 may automatically provide ISP 12 with a username and password, without requiring the users of client machines 14a–14c to enter such information.

It should be appreciated that although FIG. 1 describes an Internet application, auto-configuration device 10 may be used in conjunction with other networks, such as wireless networks. For use with wireless networks, transmitter 20 and ports 16 and 17 may be omitted and a wireless means, e.g., radio signals, may be used to transmit communications between the wireless networks and auto-configuration device 10.

Figure 2:
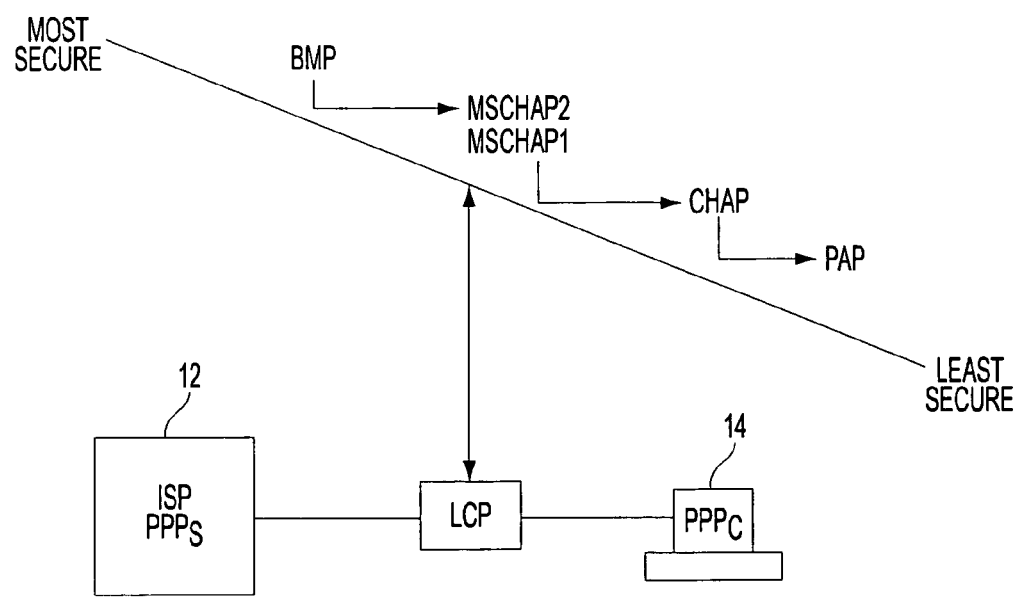
FIG. 2 describes a hierarchy of known authentication protocols.

Referring to FIG. 2, a hierarchy of different authentication protocols for transferring information between two networks is described. The authentication protocols shown in FIG. 2 range from the most secure protocol, burst mode protocol (BMP), at the top of the hierarchy to the least secure, password authentication protocol (PAP), at the bottom. The authenticating features associated with BMP comprise the most secure encryption in the hierarchy, while PAP authentication is not encrypted.

To enable communications between a first and second network using any of the authentication protocols described in FIG. 2, a compatible connection must be established. A compatible connection between networks is achieved using Link Control Protocol (LCP), which establishes, configures, and tests data-link Internet connections. Before establishing communications over a point-to-point (PPP) link, each end of the PPP link must send out LCP packets. The LCP packet either accepts or rejects the identity of its linked peer, agrees upon packet size limits, and looks for common misconfiguration errors. Once the LCP packet accepts the link, traffic can be transported on the network. For example, in FIG. 2, server PPP ($PPP_s$) of ISP 12 sends LCP packets to client PPP ($PPP_c$) of client computer 14. $PPP_c$ then sends LCP packets back to PPP$_s$, and if client computer 14 and ISP 12 are compatible then a connection may be established.

Figure 3:
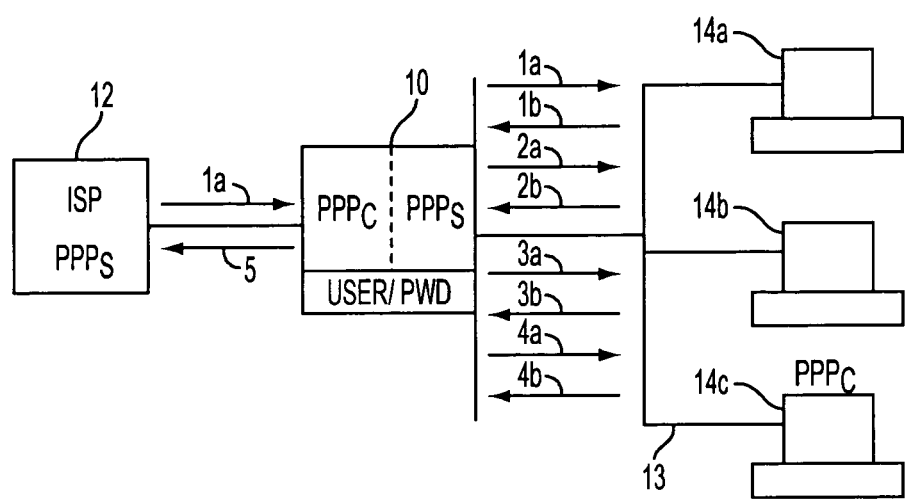
FIG. 3 is a schematic depicting a method by which the auto-configuration device of the present invention negotiates which authentication protocol will be used.

Referring to FIG. 3, a method by which auto-configuration device 10 of the present invention can be used to emulate at least one client computer 14 is described. In a first step of authentication, the user of one of client computers 14, for example, computer 14c, sends a request to connect to ISP 12. PPP$_s$ of ISP 12 then sends a "challenge" message to client computer 14c, asking for a username and password. This challenge message is represented by message 1a in FIG. 3, and may be sent using any one of the authentication protocols described in FIG. 2. Generally, ISP 12 initially requests the username and password in the most secure manner, i.e., using BMP for authentication.

When auto-configuration device 10 is placed between ISP 12 and LAN 13 as shown in FIG. 3, auto-configuration device 10 forwards challenge message 1a to client computer 14c. Client computer 14c then is prompted to provide the information requested by ISP 12, e.g., username and password, which may be stored in the computer's memory. Client computer 14c provides the information requested by the challenge message by sending response 1b back to ISP 12.

In accordance with the principle of the present invention, however, auto-configuration device 10 intercepts response 1b from client computer 14c. Specifically, auto-configuration device 10 emulates PPP$_s$ of ISP 12 by having at least one software algorithm that negotiates the authentication protocol to communicate with client computer 14c. For example, if response 1b is sent from client computer 14c to auto-configuration device 10 in LCP packets using BMP, auto-configuration device 10 will emulate PPP$_s$ of ISP 12 by relaying communication 2a back to PPP$_c$ of client computer 14c indicating that communications using BMP are not compatible with PPP$_s$. In effect, auto-configuration device 10 signals to client computer 14c that it cannot support communications in BMP, and therefore no communications in BMP are established between PPP$_c$ and PPP$_s$.

As described hereinabove, PPP$_s$ and PPP$_c$ will only be able to communicate with each other when the Link Control Protocol (LCP) accepts the identity of its linked peer and establishes that there are no misconfiguration errors. If one peer does not recognize the protocol of its linked peer, e.g., because the protocol is highly encrypted, that peer will request to use a less encrypted protocol for communication.

After auto-configuration device 10 sends response 2a indicating that it does not support communications associated with BMP, client computer 14c will subsequently send response 2b trying to establish communications in a different authentication protocol. For example, response 2b may attempt to establish communications using MSCHAP2 or MSCHAP1, which has a lower level of encryption than BMP. Auto-configuration device 10 similarly intercepts communication 2b from client computer 14c and emulates PPP$_s$ of ISP 12. The software algorithms of auto-configuration device 10 cause the device to send LCP packets 3a back to client computer 14c, indicating that communications between PPP$_s$ and PPP$_c$ cannot be supported in MSCHAP2 or MSCHAP1 protocol. Client computer 14c then will send response 3b in LCP packets to try to establish communications in a protocol having a lower level of encryption, such as CHAP. Auto-configuration device 10 similarly will respond in LCP packets 4a, emulating PPP$_s$ of ISP 12, that it does not support communications in CHAP.

Finally, client computer 14c will send response 4b in LCP packets using PAP, which is not encrypted. The software algorithms of auto-configuration device 10 accept and record this unencrypted information provided by client computer 14c. After recording the username and password, auto-configuration device 10 then requests to connect back to ISP 12. Auto-configuration device 10 then relays the username and password to ISP 12 in BMP or the highest encrypted level supported, as shown by communication 5 in FIG. 3.

Auto-configuration device 10 may perform the negotiations to intercept the identification information from client computer 14c while a connection with ISP 12 is maintained, i.e., while ISP 12 is waiting to receive communications from device 10. Alternatively, auto-configuration device 10 may intercept identification information from client computer 14c in the above-described manner even when device 10 is completely de-coupled from ISP 12, or no attempt has yet been made to establish a connection with ISP 12.

After the username and password have been stored for the first time in auto-configuration device 10, any client computer 14 within LAN 13 may access the Internet without being asked for a username and password. When a subsequent user in LAN 13 desires to access the Internet, ISP 12 will issue another challenge message requesting the username and password. Auto-configuration device 10 then automatically sends ISP 12 the stored username and password in BMP or the highest encryption level supported. In this respect, auto-configuration device 10 can emulate one or more client computers 14 when interrogated by ISP 12.

Auto-configuration device 10 also preferably serves as a router by keeping track of which computer 14 within LAN 13 is communicating with ISP 12, and by sharing the Internet connection between multiple PCs 14a–14c.

It should be noted that the line between ISP 12 and auto-configuration device 10, if initially requested, may be dropped for a period of time after ISP 12 issues challenge message 1a to client computer 14c. As noted hereinabove, as an alternative, no request for a connection need have been made to ISP 12. The authentication protocol negotiations between auto-configuration device 10 and client computer 14c may occur without a connection to ISP 12. Once auto-configuration device 10 has recorded the unencrypted information from client computer 14c, then auto-configuration device 10 will initiate a subsequent request to ISP 12, on behalf of client computer 14c, to connect for Internet access. Once that subsequent connection is made, auto-configuration device provides the recorded information to ISP 12 using the highest encryption level supported.

Figure 4:
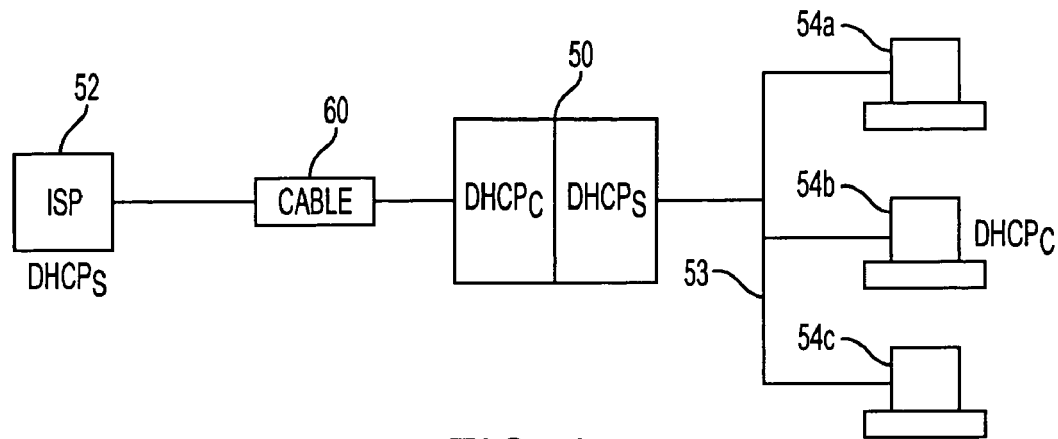
FIG. 4 is a schematic depicting the auto-configuration device of the present invention being used in conjunction with a cable modem.

Referring now to FIG. 4, a method for using auto-configuration device 50 in conjunction with a cable modem is described. Cable modem 60 uses Dynamic Host Configuration Protocol (DHCP). In accordance with DHCP protocol, a client computer (DHCP$_c$) issues a request that includes embedded within it an unencrypted Host ID and domain name. When the ISP receives and authenticates the request, the DHCP server (DHCP$_s$) then assigns an IP address and gateway server information to DHCP$_c$.

In accordance with principles of the present invention, auto-configuration device 50 captures the unencrypted Host ID and domain name from the request sent by DHCP$_c$. Device 50 then generates a DHCP$_c$ request to the ISP that includes the Host ID and domain name. Device 50 also stores the Host ID and domain name locally. When the ISP receives the request, the DHCP$_s$ assigns an IP address and gateway server information to device 50. In accordance with the methods of the present invention, in the foregoing method the auto-configuration device 50 acts as DHCP$_s$ to client computers 54 of LAN 53, and auto-configuration device 50 further acts as DHCP$_c$ to ISP 52.

Figure 5:
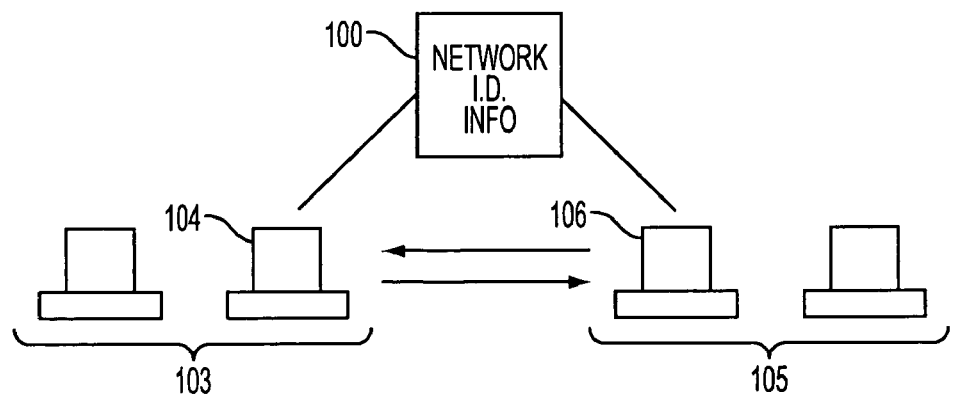
FIG. 5 describes a method for using the device of the present invention to facilitate the transfer of information between two networks.

Referring to FIG. 5, a method for using the auto-configuration device of the present invention in conjunction with network identification is described. In FIG. 5, auto-configuration device 100 provided in accordance with the present invention is adapted to receive signals transmitted between first and second networks 103 and 105. First network 103 comprises IP security computer 104 having network identification features associated with first network 103, while second network 105 comprises IP security computer 106 having network identification features associated with second network 105. In FIG. 5, for example, first network 103 may be analogous to a human resources department of a company, while second network 105 may be analogous to the accounting department of the same company.

Communications between first network 103 and second network 105 are regulated by IP security computers 104 and 106. Auto-configuration device 100, preferably containing software algorithms as described in FIG. 3, receives communications transmitted between IP security computers 104 and 106. The algorithms of auto-configuration device 100 cause IP security computers 104 and 106 to communicate with device 100 using PAP the first time so that auto-configuration device 100 can record the unencrypted network identification information of each computer. Thereafter, each time IP security computers 104 and 106 communicate, auto-configuration device 10 automatically provides the stored information in BMP, or the highest supported encryption level.

Advantageously, when a computer of first network 103 requests to communicate with second network auto-configuration device 100 receives the request and automatically provides IP security computer 106 with the required information using the highest supported encryption level. This facilitates a fast connection between networks 103 and 105, and enhances CPU performance of IP security computers 104 and 106 because they will no longer require a lengthy decryption process to enable communications.

One skilled in the art will appreciate that the present invention may be practiced by other than the described embodiments, which are presented for purposes of illustration and not limitation. It is intended that the present application cover such variations or modifications as may be apparent from the described embodiment as may fall within the scope of the appended claims.

The invention claimed is:

1. Apparatus for facilitating communications between previously connected first and second networks, the apparatus comprising:
   a device having a microprocessor programmed to receive and transmit communications between the first and second networks; and
   a programmed routine stored in memory for use with the microprocessor, the programmed routine configured to intercept and store information transferred between the first and second networks by negotiating use of an unencrypted authentication protocol,
   wherein the device is configured to automatically intercept and store information from the second network either before or at the time that the second network requests access to the first network,
   wherein the device further is configured to automatically intercept and store information from the second network by emulating the first network.

2. The apparatus of claim 1 wherein the device is further configured to automatically provide the first network with the stored information when the first network requests that information from the second network.

3. The apparatus of claim 1 wherein the device further is configured to automatically intercept and store information from the first network either before or at the time that the first network requests access to the second network.

4. The apparatus of claim 3 wherein the device is further configured to automatically provide the second network with the stored information when the second network requests that information from the first network.

5. The apparatus of claim 1 wherein the first network is an Internet service provider.

6. The apparatus of claim 5 wherein the second network is a local area network comprising at least one computer.

7. The apparatus of claim 1 wherein the programmed routine negotiates the use of password authentication protocol for communication between the device and the second network.

8. The apparatus of claim 1 wherein the programmed routine is adapted to negotiate from a more secure authentication protocol to a less secure authentication protocol.

9. The apparatus of claim 1 wherein the device is adapted to perform communications between the first and second networks using a cable modem.

10. The apparatus of claim 1 wherein the device is adapted to perform communications between the first and second networks using a digital subscriber line.

11. The apparatus of claim 1 wherein the device is adapted to perform communications between the first and second networks using a dial-up modem.

12. The apparatus of claim 1 wherein the device is adapted to perform wireless communications between the first and second networks.

13. The apparatus of claim 1 wherein the stored information comprises network identification or authentication information.

14. The apparatus of claim 13 wherein the stored information is a username and password.

15. A method for facilitating communications between previously connected first and second networks, the method comprising:
   providing a device having a microprocessor and at least one software algorithm stored in memory associated with the microprocessor;
   using the software algorithm to negotiate an authentication protocol to be used to enable communications between the first and second networks; and
   using the device to acquire information from the second network prior to or at the time that the second network requests access to the first network,
   wherein using the device to acquire information from the second network comprises emulating the first network.

16. The method of claim 15 further comprising using the device to provide the first network with the stored information when the first network requests that information from the second network.

17. The method of claim 15 further comprising using the device to acquire information from the first network prior to or at the time that the first network requests access to the second network.

18. The method of claim 17 further comprising using the device to provide the second network with the stored information when the second network requests that information from the first network.

19. The method of claim 15 wherein the software algorithm negotiates from a more secure authentication protocol to a less secure authentication protocol.

20. The method of claim 15 wherein the software algorithm causes the device and the second network to communicate using password authentication protocol.

21. The method of claim 15 wherein the stored information comprises network identification or authentication information.

22. The method of claim 21 wherein the stored information is a username and password.

23. The apparatus of claim 1 wherein the device is configured to automatically intercept and store information from the second network by negotiating with the second network when the second network is not accessing the first network.

24. The apparatus of claim 1 wherein the device is configured to automatically intercept and store information from the second network, without the need for a user to input information into the device.

25. The apparatus of claim 1 wherein the device is further configured to intercept and store information from the first network by emulating the second network,
wherein the first network is an Internet service provider.

26. The apparatus of claim 1 wherein the device is not pre-configured with network identification information or authentication information, and
wherein the device is configured to automatically intercept and store network identification information or authentication information from the second network.

27. The apparatus of claim 1 wherein the device further is configured to subsequently provide the first network with the stored information using the highest encryption level supported.

28. The apparatus of claim 1 wherein the device is configured to intercept and store information from the second network by falsely indicating that communications in an encrypted protocol cannot be supported so that an unencrypted authentication protocol is negotiated.

29. Apparatus for facilitating communications between first and second networks, the apparatus comprising:
a device having a microprocessor programmed to receive and transmit communications between the first and second networks; and
a programmed routine stored in memory for use with the microprocessor, the programmed routine configured to intercept and store information transferred between the first and second networks by negotiating use of an unencrypted authentication protocol,
wherein the device is not pre-configured with network identification information or authentication information,
wherein the device further is configured to automatically intercept and store network identification or authentication information from the second network either before or at the time that the second network requests access to the first network.

30. Apparatus for facilitating communications between first and second networks, the apparatus comprising:
a device having a microprocessor programmed to receive and transmit communications between the first and second networks; and
a programmed routine stored in memory for use with the microprocessor, the programmed routine configured to intercept and store information transferred between the first and second networks by negotiating use of an unencrypted authentication protocol,
wherein the device is configured to automatically intercept and store information from the second network either before or at the time that the second network requests access to the first network,
wherein the device further is configured to automatically intercept and store information from the first network either before or at the time that the first network requests access to the second network.

* * * * *